United States Patent
Korhonen et al.

(10) Patent No.: US 9,701,407 B2
(45) Date of Patent: Jul. 11, 2017

(54) EMERGENCY STOP FOR BLADES OF DRONE

(71) Applicant: Sharper Shape Oy, Espoo (FI)

(72) Inventors: Atte Korhonen, Espoo (FI); Tero Heinonen, Järvenpää (FI)

(73) Assignee: Sharper Shape Oy, Espoo (FI)

( * ) Notice: Subject to any disclaimer, the term of this patent is extended or adjusted under 35 U.S.C. 154(b) by 308 days.

(21) Appl. No.: 14/666,708

(22) Filed: Mar. 24, 2015

(65) Prior Publication Data

US 2016/0280364 A1 Sep. 29, 2016

(51) Int. Cl.
| | |
|---|---|
| *B64C 11/20* | (2006.01) |
| *B64C 39/02* | (2006.01) |
| *B64C 27/00* | (2006.01) |
| *B64C 11/00* | (2006.01) |
| *B64C 27/473* | (2006.01) |

(52) U.S. Cl.
CPC .......... *B64C 39/024* (2013.01); *B64C 11/002* (2013.01); *B64C 11/20* (2013.01); *B64C 27/006* (2013.01); *B64C 27/473* (2013.01); *B64C 2201/027* (2013.01); *F05D 2260/902* (2013.01)

(58) Field of Classification Search
CPC ............ B64C 39/024; B64C 2201/027; B64C 2201/024; B64C 27/08; B64C 27/473; B64C 27/006; B64C 27/007; B64C 11/002; B64C 11/20; F05D 2260/902
See application file for complete search history.

(56) References Cited

U.S. PATENT DOCUMENTS

| | | | |
|---|---|---|---|
| 4,026,660 A * | 5/1977 | Ueda ..................... | B64C 27/007 416/226 |
| 5,952,836 A * | 9/1999 | Haake .................. | G01R 31/026 324/718 |
| 7,750,643 B2 * | 7/2010 | Rose ...................... | G01N 19/08 324/525 |
| 2016/0200415 A1 * | 7/2016 | Cooper ................. | B64C 39/024 244/17.15 |

* cited by examiner

*Primary Examiner* — Ninh H Nguyen

(74) *Attorney, Agent, or Firm* — Ziegler IP Law Group, LLC

(57) ABSTRACT

Disclosed is a drone having at least one rotor. The at least one rotor comprises a mast and at least two blades having a proximal end and a distal end. The at least two blades are arranged in connection with the mast by their proximal ends. The at least one of the blades comprises an electrically conductive element extending a distance D between its distal end and its proximal end. The electrically conductive element is electrically coupled with means for stopping the blades, thus forming an electrical circuit. The means for stopping the blades is arranged to be actioned when at least one electrical property of the electrical circuit change.

12 Claims, 3 Drawing Sheets

EMERGENCY STOP FOR BLADES OF DRONE

TECHNICAL FIELD

The present disclosure relates generally to an unmanned aerial vehicle; and more specifically, to a drone configured to stop blades thereof in an emergency situation.

BACKGROUND

Unmanned flying objects, such as Unmanned Aerial Vehicles (UAV) or drones, are used for various tasks, in particular for multiple civilian purposes. For example, the drones may be used for survey, inspection, search and rescue, security, and surveillance purposes. Further, the drones may be classified and categorized in terms of range or altitude, shapes, sizes, roles and the like. Typically, the drones include various structural and functional components for the operation thereof. For example, blades of the drone are one of the most important structural and functional components as they enable in lifting and propelling the drone through the air.

In operation, the drones may be subjected to various situations and are required to operate depending upon such situations. For example, the drones may be subjected to an emergency situation when the drone, particularly, the blades thereof hits any object in the air. Therefore, in such emergency situations, stopping the blades of the drone becomes a matter of highest priority due to its functional and physical aspects. For example, the damage caused by the blades during an uncontrolled emergency landing of the drone can be extreme due to its high rotation speed (or kinetic energy) and sharp edges. Specifically, the blades can hit a person or any object in the ground causing severe injury to the person or substantial functional and physical damage to the object due to its high rotational speed and the sharp edges.

Therefore, in light of the foregoing discussion, there exists a need to overcome the aforementioned drawbacks associate with blades of a drone during an emergency situation.

SUMMARY

The present disclosure seeks to provide a drone configured to stop blades thereof in an emergency situation.

In one aspect, an embodiment of the present disclosure provides a drone comprising at least one rotor, which rotor comprises
a mast; and
at least two blades having a proximal end and a distal end, and the at least two blades being arranged in connection with the mast by their proximal ends,
wherein
at least one of the blades comprises an electrically conductive element extending a distance D between its distal end and its proximal end, the electrically conductive element being electrically coupled with means for stopping the blades, thus forming an electrical circuit, and
the means for stopping the blades is arranged to be actioned when at least one electrical property of the electrical circuit change.

Embodiment of the present disclosure substantially eliminates or at least partially addresses the aforementioned problems in the prior art, by providing an emergency stop for blades of a drone.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
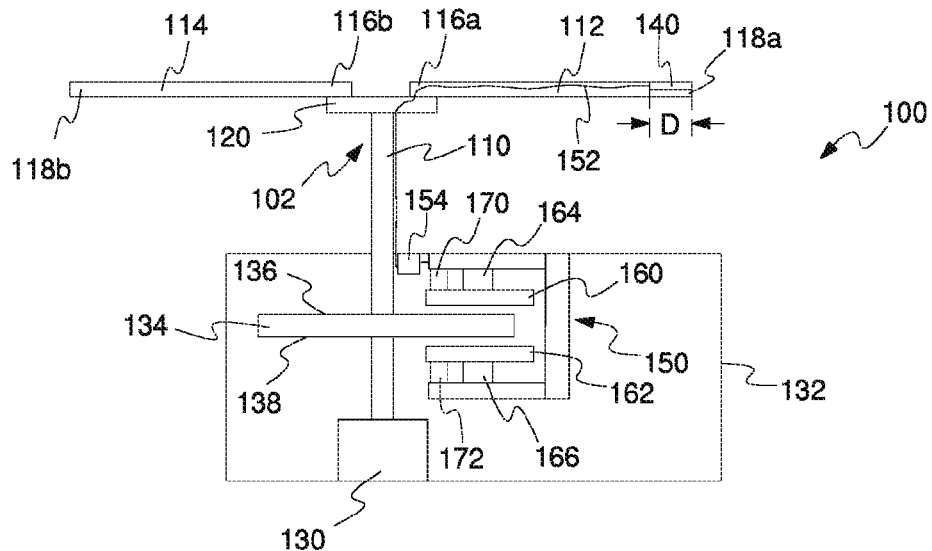
FIG. 1 is a schematic illustration of a drone, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a drone comprising at least one rotor. The at least one rotor comprises a mast and at least two blades having a proximal end and a distal end. The at least two blades are arranged in connection with the mast by their proximal ends. At least one of the blades comprises an electrically conductive element extending a distance D between its distal end and its proximal end. The electrically conductive element is electrically coupled with means for stopping the blades, thus forming an electrical circuit. The means for stopping the blades is arranged to be actioned when at least one electrical property of the electrical circuit change.

In an embodiment, the present disclosure broadly relates to an Unmanned Aerial Vehicle (UAV) such as a drone. The drone can fly over a geographical area to perform a variety of tasks such as collecting data related to the geographical area, monitoring the area and the like. In an example, the drone may be used for monitoring forestry/vegetation in the vicinity of power lines.

In an embodiment, the drone may be controlled autonomously based on pre-programmed route and/or mission data. For example, an on-board computing system having pre-programmed instructions (such as route information or other mission data) controls the drone. Alternatively, the drone may be controlled by a remote operator present on an operations base. For example, instructions related to the route and other parameters associated with the drone are controlled by the remote operator present on the operations base. The drone and the operations base may be communicably coupled to each other using a data link, which may include but are not limited to wireless links, satellite links, radio links and the like.

According to one embodiment, the drone includes various components such as a propulsion system, a flight control system, a navigation system, a sensor system, a communication system, a power system and an airframe. The propulsion system includes an engine and a means to propel the engine to assist in acceleration of the drone. The flight control system enables controlling operation modes of the drone. The navigation system provides location data and controls the heading direction of the drone. The sensor system collects various types of data including environmental conditions and the like. The communication system communicates with the drone and the operations base. The power system supplies power to operate the various components of the drone. The airframe refers to the physical structure including wings, actuators, body and the like.

The drone of the present disclosure primarily includes at least one rotor having a mast and at least two blades. The drone may also comprise more than one rotor, such as two, three or four rotor. Each rotor may comprise two or more blades, such as three or four blades. The drone may for example comprise two rotors, of which one comprises two blades and the other four blades. Therefore, it may be evident to those skilled in the art that the present disclosure mainly relates to the propulsion system, i.e. rotors of the drone, which enable in lifting and propelling the drone in the air.

The mast of the rotor is a cylindrical shaft (axle) that supports the blades thereon. Specifically, each of the at least two blades comprises a proximal end and a distal end, and the at least two blades arranged in connection with the mast by their proximal ends. For example, the proximal ends of the blades are coupled to the mast using a central support element (a rectangular or circular plate like structure). The proximal ends of the blades may be coupled to end portions of the central support element with bolts. Further, a central portion of the central support element is coupled to an end portion (such as a top end) of the mast. For example, the top end portion of the mast may be threadably coupled or welded to the central portion of the central support element.

In an embodiment, the mast is further operatively coupled to a rotary motion source, such as a shaft of a motor or an engine, to obtain rotary motion therefrom. The mast may be operatively coupled to the shaft (of the motor or the engine) using a gear arrangement or a belt arrangement. Further, the rotary motion source may be mounted on a chassis of the drone.

In an embodiment, the mast is also operatively coupled to a flywheel for storing rotational energy therein. The flywheel also provides continuous and increased energy beyond the ability of the rotary motion source. In an example, the flywheel may be a circular disc like structure having substantial weight for storing and providing increased rotational energy. Further, the flywheel includes a top surface, a bottom surface and a smooth or a serrated peripheral (or tangential) edge.

As mentioned above, at least one of the blades comprises an electrically conductive element. Alternatively, more than one (such as two, three or four) or all the blades comprise an electrically conductive element.

In one embodiment, the electrically conductive element includes at least one of a pad, a foil or a line made of electrically conductive material such as iron, copper, aluminium, silver and the like. Specifically, the electrically conductive element may be associated with at least one measurable electrical property such as conductivity, capacitance, resistance and the like. Further, the electrically conductive element may be a continuous single element (configuring a close electrical circuit) or spaced apart elements (configuring an open electrical circuit), which is explained in greater detail herein later.

In an embodiment, the electrically conductive element is arranged on a leading edge of the blade. For example, when the electrically conductive element is in the form of a continuous line, the electrically conductive element may be arranged (for example printed) on the leading edge of the blade. The term 'leading edge' used herein means the edge of a blade that hits the air when the blade is rotating. In such instance, the electrically conductive element is also exposed to air. It may be evident that the blade also includes a trailing edge opposite and parallel to the leading edge. The leading and trailing edges of the blade may be designed aerodynamically to produce required lift for lifting the drone.

In another embodiment, the electrically conductive element is arranged on a surface of the blade. For example, when the electrically conductive element is in the form of a pad or a foil, the electrically conductive element may be suitably arranged, such as glued or welded, over the surface of the blade. In such instance, the electrically conductive element can be a large seal enclosing a blade therein.

The electrically conductive element extends a distance D between its distal end and its proximal end. According to one embodiment, the electrically conductive element is arranged to extend from the distal end(s) towards the proximal end(s) of the blade(s). For example, the electrically conductive element can extend up to a tip (such as the distal end) from a base (such as the proximal end) of a blade or close to the tip of the blade.

In an embodiment, the distance D is at least 5% of a total distance between the distal end and the proximal end of the blade. Alternatively, the distance D is 100% of the total distance between the distal end and the proximal end of the blade. Specifically, the distance D can be any percentage of the total length between the distal end and the proximal end of the blade. For example, the distance D can be also less than 5% (such as 3 or 4%) of the total distance, or for example from 5, 10, 15, 20, 25, 30, 35, 40, 45, 50, 55, 60, 65, 70, 75, 80, 85 or 90% of the total distance up to 10, 15, 20, 25, 30, 35, 40, 45, 50, 55, 60, 65, 70, 75, 80, 85, 90, 95 or 100% of the total distance between the distal end and the proximal end of the blade.

The electrically conductive element is electrically coupled with means for stopping the blades, and thus forming an electrical circuit. Specifically, the electrically conductive element and the means for stopping the blades are electrically coupled in a manner such that a closed loop electrical circuit is formed, when the electrically conductive element is the continuous single element. Alternatively, when the electrically conductive element is spaced apart elements, the electrically conductive element and the means for stopping the blades form an open loop electrical circuit.

In an embodiment, the electrically conductive element is electrically coupled with means for stopping the blades via means selected from the group consisting of a wire, an electrically conductive printed circuit, a conductive sheet and combinations thereof. This enables defining a predetermined measured value of at least one electrical property to be associated with the electrical circuit (formed by the electrically conductive element and the means for stopping the blades).

The means for stopping the blades is arranged to be actioned when at least one electrical property of the electrical circuit change. Specifically, in case of emergency situation, i.e. when at least one blade of the drone has hit any object in the air, the electrical circuit may experience or be subjected to a change in at least one electrical property. For example, the at least one electrical property can be selected from the group consisting of conductivity and capacitance.

In one embodiment, the electrical circuit includes a measuring unit configured to measure change in the electrical property of the electrical circuit. Specifically, the measuring unit may be constituted by electrical components, such as a microprocessor and sensors, capable of measuring change in the electrical property (such as conductivity or capacitance) of the electrical circuit. The measuring unit measures the change in the electrical property of the electrical circuit for detecting a collision between a blade and an object. Therefore, the change in the electrical property of the electrical circuit represents the emergency situation (when there is the collision between the blade and the object).

In an embodiment, the electrical property (such as conductivity or capacitance) of the electrically circuit may alter due to the collision. For example, the collision can physically deform (damage) or break the electrically conductive element causing change in the electrical property of the electrical circuit. Therefore, in such instance, the means for stopping the blades comes into action with such change in the electrical property of the electrical circuit.

In one embodiment, the change in the electrical property may be determined by passing electricity through the electrical circuit. For example, a predetermined amount of electricity may be running through the electrical circuit or a predetermined voltage is maintained across certain points of the electrical circuit, which is continuously measured by the measuring unit. Once, no current (or zero voltage) is measured by the measuring unit the electrical circuit is subjected to a change in the electrical property (such as the electrical conductivity). This may occur if the electrically conductive element or the wire connecting the electrically conductive element with the means for stopping the blades breaks due to the collision of the blades with the object.

In another embodiment, when the electrically conductive element is a large conductive seal, the change in the electrical property (for example, change in the capacitance or electrical charge held by the conductive seal) occurs when the conductive seal undergoes change in its shape due to the collision. Specifically, the change in the shape of the electrically conductive element causes change or deviation in the capacitance of the electrically conductive element which can be measured or detected by the measuring unit. Accordingly, such change in the electrical property of the electrical circuit allows the means for stopping the blades to come into action for stopping the blades.

In another embodiment, when the electrically conductive element includes spaced apart conductive elements, the change in the electrical property of the electrical circuit occurs when the spaced apart conductive elements contact each other. For example, electrical current can pass thought the electrical circuit when the spaced apart conductive elements contact each other due to the collision. Specifically, the spaced apart conductive elements contact to form a closed electrical loop (due to the collision) and the measuring unit measures a certain current (or voltage), detecting the change in the electrical property of the electrical circuit. Accordingly, the means for stopping the blades comes into action for stopping the blades.

In an embodiment, the means for stopping the blades is selected from the group consisting of a disc brake and a combination of cogwheel (gear) and block. The means for stopping the blades may also include a releasing means configured to be electrically actuated or triggered for the operation of the means for stopping the blades. The releasing means can be a magnet, a spring, an explosive, pressure, gas and the like. Further, the blades may be stopped with the application of electrical and/or mechanical energy and by operatively and/or physically stopping at least one of the flywheel, motor, gear arrangement, mast or the blades directly.

In an embodiment, when the means for stopping the blades includes the disc brake, the mechanical energy (friction) is applied by pads of the disc brake on the top and bottom surfaces of the flywheel for stopping the rotation of the mast and thereby stopping the rotation of the blades. Alternatively, the pads of the disc brake may be configured to apply mechanical friction on a smooth peripheral edge (instead of the top and bottom surfaces) of the flywheel for stopping the blades.

In another embodiment, when the means for stopping the blades includes the combination of the cogwheel and the block, the mechanical energy is applied by the block on a peripheral edge of the cogwheel. It is to be understood that the cogwheel may be mounted or coupled to the mast, and the block (which may be made of hard plastic, metal, rubber or any combination thereof) is placed adjacent to the cogwheel. Therefore, in case of the emergency situation the block is moved (actuated by the releasing means) to contact the peripheral edge of the cogwheel. In the process, the block undergoes physical deformation to absorb kinetic energy and momentum of the cogwheel.

In one embodiment, the flywheel with the serrated peripheral edge may act as the cogwheel and the block may be placed adjacent to the flywheel. In such instance, the block contacts the serrated peripheral edge of the flywheel to undergo physical deformation for stopping the blades in the emergency situation.

In operation, when the drone is subjected to the emergency situation, i.e. when the blades of the drone are hit by any object in the air, the electrical property (such as conductivity or capacitance) of the electrical circuit may alter due to such collision. Upon detection of the change in the electrical property of the electrical circuit by the measuring unit the means for stopping the blades comes into action for stopping the rotation of the blades. Specifically, the means for stopping the blades may be electrically triggered by the releasing means to apply disc brake on top and bottom surfaces of the flywheel or press the block against the peripheral serrated edge of the flywheel (or cogwheel) for absorbing the momentum or kinetic energy of the flywheel (or cogwheel) and thereby stopping the blades from further rotation. Also, in such instance the operation of rotary motion source, such as the motor or the engine, is stopped.

In one embodiment, the blades are arranged to be tilted with respect to their operating positions when the means for stopping the blades is actioned. Specifically, in addition to stopping the blades, the blades are also tilted with respect to their operating positions to have a smaller physical reach (diameter) as compared to an operating position. For example, when the means for stopping the blades comes into action the mast stops, which in turn stops the central support element. In such instance, momentum of the blades tilt the blades around the bolts (coupling the blades with the central support element) making the blades to position perpendicular with respect to the central support element. The tilted position of the blades causes reduction in the physical reach of the blades in the emergency situation as compared to the operating position. The reduced physical reach (diameter) of the blades in the emergency situation reduces possibility for the blades to injure a person or damage any object in the land during emergency landing.

In another embodiment, the means for stopping the blades is further electrically coupled with a landing gear of the drone. Specifically, when the drone is subjected to the emergency situation the landing gear comes into action in addition to stopping the blades. The landing gear may include one of parachutes, airbags and shields. The landing gear is configured to attain a deployed state for protecting (i.e. either avoiding or minimizing) the drone from any physical or functional damage that may be caused due to the emergency and uncontrolled landing of the drone on land or water.

The present disclosure provides a drone, particularly, an emergency stop for blades of the drone. The emergency stop, such as the means for stopping the blades, comes into action as soon as the blades hit any object in the air. The means for stopping the blades stops further rotation of the blades and allows the blades to attain a structural configuration (tilted position) to have lesser physical reach. Therefore, by containing the rotation (i.e. kinetic energy and momentum) and the physical reach of the blades in the emergency situation, a damage that may be caused by the blades to a person or any object present on the ground can be minimized or avoided.

DETAILED DESCRIPTION OF THE DRAWINGS

Referring to FIG. 1, illustrated is a schematic illustration of a drone 100, in accordance with an embodiment of the present disclosure. The drone 100 includes a rotor 102 having a mast 110 and at least two blades, such as the blades 112 and 114. Each of the blades 112, 114 includes a proximal end, such as proximal ends 116a and 116b respectively, and a distal end, such distal ends 118a and 118b respectively. The proximal ends 116a, 116b of the blades 112, 114 are coupled to the mast 110. Specifically, the proximal ends 116a, 116b of the blades 112, 114 are coupled to a central support element 120, which is coupled to the mast 110. The mast 110 is operatively coupled to a motor 130 mounted on a chassis 132 of the drone 100. Also, the mast 110 is coupled to a flywheel 134 having a top surface 136 and a bottom surface 138.

The at least one blade, such as the blade 112, includes an electrically conductive element 140. The electrically conductive element 140 extends a distance D between the distal end 118a and the proximal end 116a of the blade 112.

The drone 100 also includes a means 150 for stopping the blades 112, 114 (hereinafter referred to as stopping means 150). The stopping means 150 is electrically coupled with the electrically conductive element 140 with a wire 152. The stopping means 150 includes a measuring unit 154 electrically coupled with the electrically conductive element 140 via the wire 152 and forms an electrical circuit. The measuring unit 154 is configured to measure at least one electrical property (such as conductivity or capacitance) of the electrical circuit (constituted by the electrically conductive element 140 and stopping means 150).

As shown, the stopping means 150 is a disc brake and it is mounted on the chassis 132. The stopping means 150 includes a pair of pads 160 and 162 positioned adjacent to the top and bottom surfaces 136, 138 of the flywheel 134. The stopping means 150 also includes springs 164, 166 configured to press pads 152 and 154 against the top and bottom surfaces 136, 138 of the flywheel 140. The stopping means 150 also includes releasing means 170, 172 (which are electrically triggered when the measuring unit 154 measures any change in an electrical property of the electrical circuit) for mechanically actuating the springs 164, 166 for initiating a stopping function for the blades 112, 114 in the emergency situation.

Figure 2A:
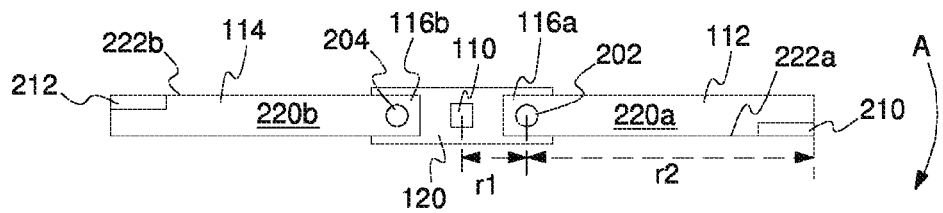
FIGS. 2A-B are schematic illustrations of blades of the drone of FIG. 1 in an operating position and an emergency situation, respectively, in accordance with various embodiments of the present disclosure.
Figure 2B:
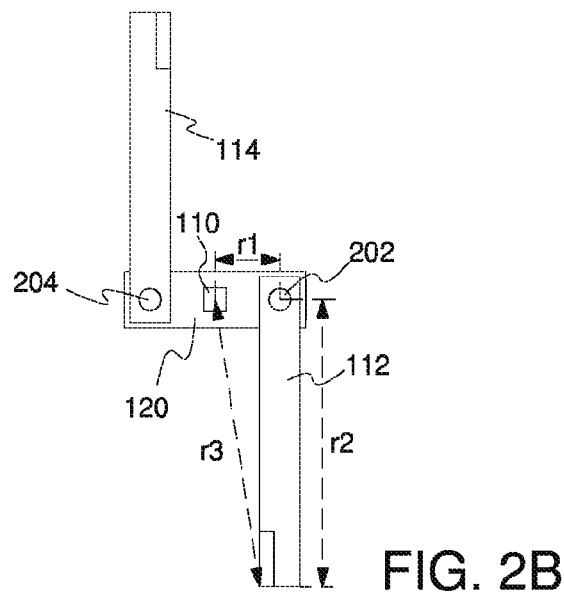

Referring now to FIGS. 2A-B, shown are schematic illustrations of the blades 112, 114 in an operating position and an emergency situation, respectively, in accordance with various embodiments of the present disclosure. Specifically, the blades 112, 114 are shown from the top with a rotating direction (shown with an arrow A). The blades 112, 114, particularly, the proximal ends 116a, 116b thereof, are connected to the central support element 120 with bolts 202 and 204. Further, each of the blades 112, 114 are shown to include an electrically conductive element, such as electrically conductive elements 210, 212, respectively arranged on a top surface, such as top surface 220a and 220b, of the blades 112, 114. Also, the electrically conductive elements 210, 212 are arranged along the leading edges 222a and 222b of the blades 112, 114 respectively.

In FIG. 2A, the blades 112, 114 are positioned longitudinally with respect to the to the central support element 120, however in FIG. 2B the blades 112, 114 are positioned perpendicular with respect to the central support element 120. Further, as shown in FIG. 2A, a distance from a midpoint of the mast 110 to tip of the blades, such as the blade 112, is r1+r2, i.e. when the blades 112, 114 are rotating normally during operation or in operating position. However, as shown in FIG. 2B, during the emergency situation (when at least one of the blades 112, 114 hits any object) the mast 110 stops, which in turn stops the central support element 120. Therefore, in such instance, momentum of the blades 112, 114 tilts the blades 112, 114 around the bolts 202, 204 to a perpendicular position (90 degrees) with respect to the to the central support element 120. Further, as shown, in such instance, $r3=\sqrt{(r1^2+r2^2)}$, which is less than r1+r2 (distance from the midpoint of the mast 110 to the tip of the blade 112).

Figure 3:
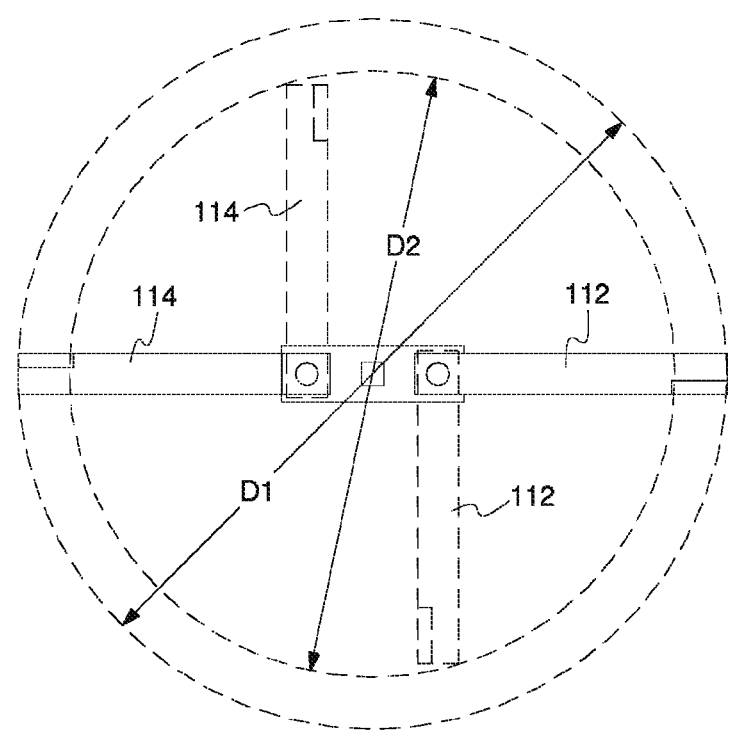
FIG. 3 is a schematic illustration of the blades of FIGS. 2A-B having different physical reach in the operating position and the emergency situation, in accordance with an embodiment of the present disclosure.

Referring now to FIG. 3, shown is a schematic illustration of the blades 112, 114 of FIGS. 2A-B having different physical reach in the operating position and the emergency situation, in accordance with an embodiment of the present disclosure. As shown, the blades 112, 114 (in the operating position, shown with solid lines) define a diameter D1, which is larger than diameter D2 defined by the blades 112, 114 in the emergency situation (shown with dashed lines).

Figure 4A:
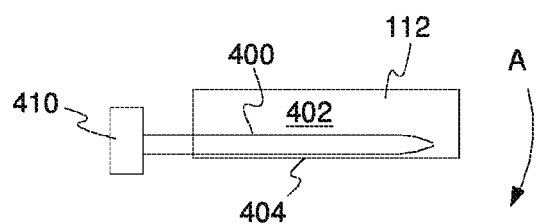
FIGS. 4A-B are schematic illustrations of a single blade in the operating position and the emergency situation, respectively, in accordance with various embodiments of the present disclosure.
Figure 4B:
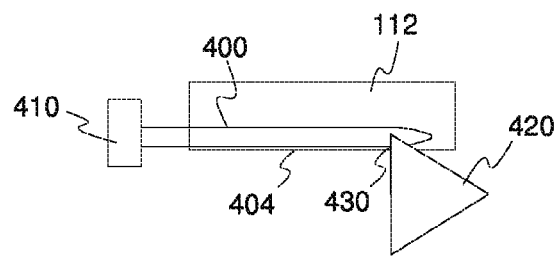

Referring now to FIGS. 4A-B, shown are schematic illustrations of a single blade, such as the blade 112, in the operating position and the emergency situation, respectively, in accordance with various embodiments of the present disclosure. As shown in FIG. 4A, the blade 112 is shown to rotate in the direction indicated by the arrow A. Further, the blade 112 includes a conductive loop 400 (which can be a combination of the electrically conductive element 140 and the wire 152 of FIG. 1) arranged on a top surface 402 of the blade 112. The conductive loop 400 is also arranged is such a manner that at least a part of the conductive loop 400 is positioned on a leading edge 404 of the blade 112. Further, a measuring unit 410 is shown to be operatively (electrically) coupled the conductive loop 400, which is configured to detect any changes in the electrical property in an electrical circuit (i.e. the conductive loop 400).

FIG. 4B illustrates the blade 112 in the emergency situation, i.e. when the leading edge 404 of the blade 112 has hit an object 420. The collision of the blade 112 and the object 420 has damaged (or broken) the conductive loop 400 at a place 430. This causes change in the electrical properties of the electrical circuit, for example due broken conductive loop 400 no current can pass thought the electrical circuit. Therefore, once the measuring unit 410 detects no current is passing thought the electrical circuit a stopping means (such as the stopping means of FIG. 1) comes into action for stopping the blade 112.

Figure 5A:
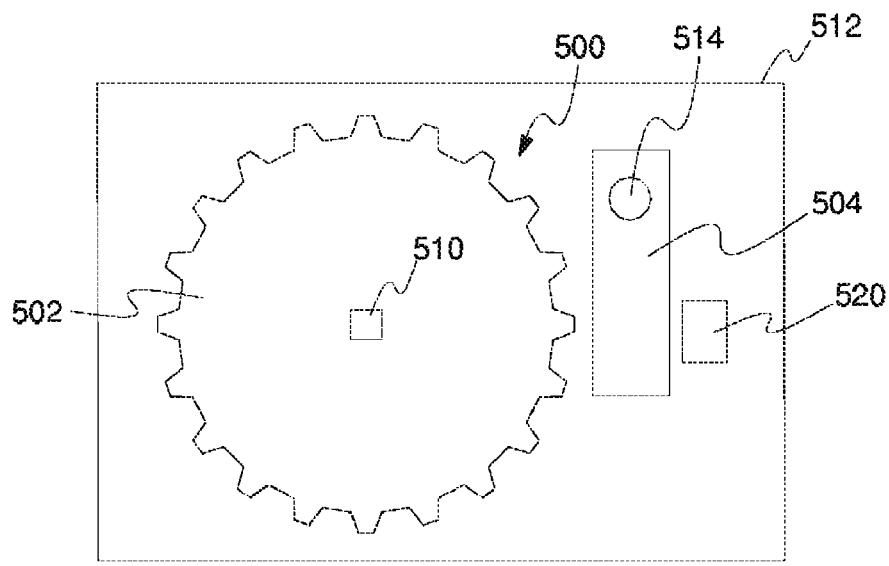
FIGS. 5A-B are schematic illustrations of means for stopping the blades in the operating position and the emergency situation, respectively, in accordance with various embodiments of the present disclosure.
Figure 5B:
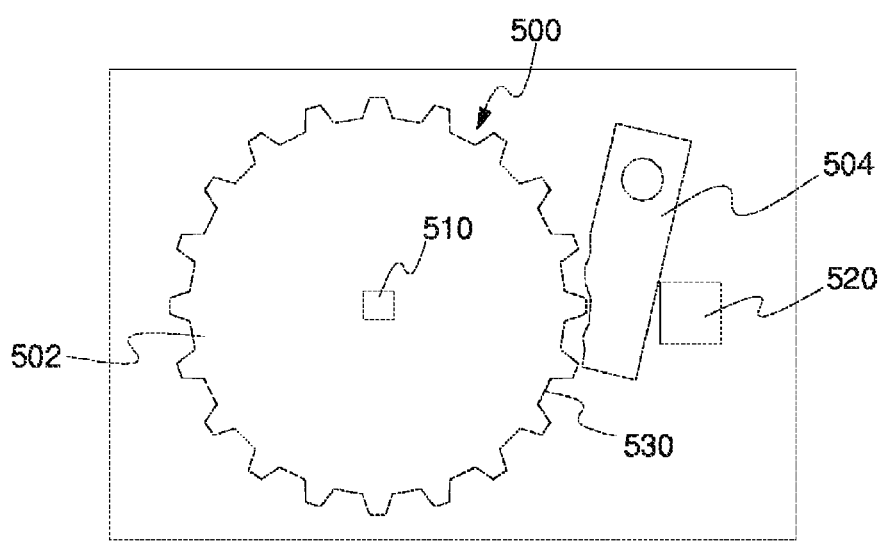

Referring now to FIGS. 5A-B, shown are schematic illustrations of means for stopping the blades, such as a stopping means 500, in the operating position and the emergency situation, respectively, in accordance with various embodiments of the present disclosure. The stopping means 500 includes a combination of a cogwheel 502 (or a flywheel with serrated peripheral edge) and a block 504. The cogwheel 502 is coupled to a mast 510 and the block 504 is coupled to a chassis 512 with fastener 514. The stopping means 500 also includes a spring 520 for moving the block 504 towards the cogwheel 502 in the emergency situation.

In normal operation condition (as shown in FIG. 5A), the block 504 is positioned away from the cogwheel 502. However, in emergency situation (as shown in FIG. 5B) the spring 520 presses the block 504 against a serrated peripheral edge 530 of the cogwheel 502. The block 504 accordingly undergoes physical deformation to absorb the kinetic energy and momentum of the cogwheel 502 and thereby stopping the rotation of the mast 510, which in turn stops rotation of the blades, such as the blades of the drone shown in FIG. 1.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A drone comprising at least one rotor, which rotor comprises
    a mast; and
    at least two blades having a proximal end and a distal end, and the at least two blades being arranged in connection with the mast by their proximal ends,
wherein
    at least one of the blades comprises an electrically conductive element extending a distance D between its distal end and its proximal end, the electrically conductive element being electrically coupled with means for stopping the blades, thus forming an electrical circuit, and
    the means for stopping the blades is arranged to be actioned when at least one electrical property of the electrical circuit change.

2. A drone according to claim 1, wherein the electrically conductive element is arranged on a leading edge of the blade.

3. A drone according to claim 1, wherein the electrically conductive element is arranged to extend from the distal end towards the proximal end.

4. A drone according to claim 1, wherein the distance D is at least 5% of a total distance between the distal end and the proximal end of the blade.

5. A drone according to claim 4, wherein the distance D is 100% of the total distance between the distal end and the proximal end of the blade.

6. A drone according to claim 1, wherein the electrically conductive element is electrically coupled with means for stopping the blades via means selected from the group consisting of a wire, an electrically conductive printed circuit, a conductive sheet and combinations thereof.

7. A drone according to claim 1, wherein the means for stopping the blades is further electrically coupled with a landing gear of the drone.

8. A drone according to claim 1, wherein the means for stopping the blades is selected from the group consisting of a disc brake and a combination of cogwheel and block.

9. A drone according to claim 1, wherein the at least one electrical property is selected from the group consisting of conductivity and capacitance.

10. A drone according to claim 1, wherein the blades are arranged to be tilted with respect to their operating position when the means for stopping the blades is actioned.

11. A drone according to claim 1, wherein the conductive element is arranged on a surface of the blade.

12. A drone according to claim 1, wherein all the blades comprise an electrically conductive element.

* * * * *